United States Patent
Ishibiki

(10) Patent No.: US 11,825,199 B2
(45) Date of Patent: Nov. 21, 2023

(54) DRIVING DEVICE CAPABLE OF PROPERLY RESTRICTING TRANSLATIONAL MOVEMENT AND ROTATIONAL MOVEMENT, IMAGE CAPTURING APPARATUS, AND METHOD OF CONTROLLING DRIVING DEVICE

(71) Applicant: CANON KABUSHIKI KAISHA, Tokyo (JP)

(72) Inventor: Jumpei Ishibiki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/851,257

(22) Filed: Jun. 28, 2022

(65) Prior Publication Data
US 2023/0007177 A1 Jan. 5, 2023

(30) Foreign Application Priority Data
Jul. 2, 2021 (JP) .................................. 2021-110972

(51) Int. Cl.
*H04N 23/68* (2023.01)
*H04N 23/50* (2023.01)
*H04N 23/54* (2023.01)

(52) U.S. Cl.
CPC ........... *H04N 23/687* (2023.01); *H04N 23/50* (2023.01); *H04N 23/54* (2023.01)

(58) Field of Classification Search
CPC ....... H04N 23/50–52; H04N 23/54–55; H04N 23/57; H04N 23/68; H04N 23/682; H04N 23/687; G03B 5/02; G03B 2205/00–0038; G03B 2205/0053–0084; G02B 27/64; G02B 27/646

See application file for complete search history.

(56) References Cited

U.S. PATENT DOCUMENTS

| | | | |
|---|---|---|---|
| 2016/0357027 A1* | 12/2016 | Izumi ...................... | G02B 27/64 |
| 2020/0225506 A1* | 7/2020 | Awazu ..................... | G03B 5/06 |
| 2020/0225507 A1* | 7/2020 | Awazu ................. | H04N 23/687 |
| 2020/0228711 A1* | 7/2020 | Awazu ............... | H04N 23/6812 |
| 2020/0228712 A1* | 7/2020 | Awazu ................. | H04N 23/687 |
| 2020/0228713 A1* | 7/2020 | Awazu ................. | G02B 27/646 |
| 2021/0149210 A1* | 5/2021 | Fukushima .......... | H04N 23/687 |
| 2022/0264013 A1* | 8/2022 | Ishibiki .................... | G03B 5/00 |
| 2023/0102719 A1* | 3/2023 | Abe ...................... | H04N 23/685 |
| | | | 396/55 |

FOREIGN PATENT DOCUMENTS

JP 3969927 B2 9/2007

* cited by examiner

*Primary Examiner* — Paul M Berardesca
(74) *Attorney, Agent, or Firm* — Cowan, Liebowitz & Latman, P.C.

(57) ABSTRACT

A driving device that has a movable part which is translationally and rotationally movable within a plane with respect to a fixed part and is capable of properly restricting the translational movement and the rotational movement of the movable part while preventing the movable part from protruding outward. The driving device includes an actuator that drives the movable part, a first restricting unit configured to restrict translational movement of the movable part, and a second restricting unit configured to restrict rotational movement of the movable part. The second restricting unit is arranged at a location more remote from a center of rotation of the movable part with respect to the fixed part than the first restricting unit.

15 Claims, 13 Drawing Sheets

DRIVING DEVICE CAPABLE OF PROPERLY RESTRICTING TRANSLATIONAL MOVEMENT AND ROTATIONAL MOVEMENT, IMAGE CAPTURING APPARATUS, AND METHOD OF CONTROLLING DRIVING DEVICE

BACKGROUND OF THE INVENTION

Field of the Invention

The present invention relates to a driving device, an image capturing apparatus equipped with the driving device, and a method of controlling the driving device.

Description of the Related Art

There is known a driving device that moves a movable part within a plane with respect to a fixed part, and there is conventionally employed a system called VCM (voice coil motor) as a component configured to generate a driving force for driving the movable part. In the VCM system, a magnet is arranged on one of the movable part and the fixed part and a coil is arranged on the other of them, and a driving force is generated by energizing the coil in a magnetic circuit formed by the magnet.

As an example of application of this driving device, there may be mentioned a shake correction mechanism mounted on an image capturing apparatus. In the shake correction mechanism, an image sensor or a shake correction lens is mounted on a movable part, and based on a shake amount detected by a predetermined sensor, the movable part is driven so as to cancel out a detected shake. Particularly, the shake correction mechanism having the image sensor mounted on the movable part is higher in shake correction performance than the shake correction mechanism having the shake correction lens mounted on the movable part in that it is possible to correct rotation about an axis orthogonal to an imaging surface of the image sensor (image capturing optical axis).

In the driving device of this type, a restricting section is provided to prevent drop-off of the movable part from the fixed part. In a driving device in which the movable part is rotatable about the image capturing optical axis, such as the shake correction mechanism of the image capturing apparatus, this restricting section is required to be arranged at a location where it does not interfere with the rotational movement of the movable part. Further, in general, in such a shake correction mechanism, a plurality of balls are arranged between the movable part and the fixed part to reduce contact resistance, whereby it is possible to perform smooth driving. For the arrangement of the balls, an enclosure for preventing the balls from dropping off in a direction parallel to a rolling surface is provided. Further, the movable part and the fixed part are provided with an abutting portion and an abutted portion for restricting the movement of the movable part with respect to the fixed part, respectively.

For example, Japanese Patent No. 3969927 discloses a technique for performing, before photographing, an operation of resetting the position of balls in a shake correction device that moves a lens group by using a two-axis driving device, to thereby prevent the balls from being brought into contact with an enclosure during actual use. Further, Japanese Patent No. 3969927 describes a movable mechanical end provided for limiting the movement of the movable part.

Incidentally, a user sometimes performs photographing using an image capturing apparatus while walking, and here, a shake occurring in this situation is referred to as the "walking shake". The walking shake becomes larger in shake amount than a shake occurring in a case where a user performs photographing in a state standing still, and hence there is a demand for a shake correction device that is capable of canceling out a larger shake amount.

The shake correction device of the image capturing apparatus can correct a large shake amount by increasing a movement amount of the movable part holding the image sensor or the shake correction lens with respect to the fixed part. Particularly, when the walking shake occurs, a shake amount of rotation about the image capturing optical axis tends to become large, and hence by increasing a movement amount by which the movable part is rotatable about the image capturing optical axis (as the central axis) with respect to the fixed part, it is possible to increase the effect of shake correction.

Here, the shake correction device described in Japanese Patent No. 3969927 is configured to allow the movable part to translationally move only within a plane orthogonal to the optical axis as described above, but is not configured to allow the movable part to rotationally move within the plane. Further, Japanese Patent No. 3969927 does not disclose a specific configuration of the movable mechanical end for limiting the movement of the movable part. Further, if the rotational movement amount of the movable part with respect to the fixed part is increased, an amount by which the movable part protrudes outward increases, which can result in an increase of the size of the image capturing apparatus. To avoid this inconvenience, for the driving device having the movable part that is translationally and rotationally movable, a configuration is required in which the translational movement and the rotational movement of the movable part are properly restricted while preventing the movable part from protruding outward.

SUMMARY OF THE INVENTION

The present invention provides a driving device that has a movable part which is translationally and rotationally movable within a plane with respect to a fixed part, wherein the translational movement and the rotational movement of the movable part can be properly restricted while preventing the movable part from protruding outward, an image capturing apparatus including the driving device, and a method of controlling the driving device.

In a first aspect of the present invention, there is provided a driving device including a fixed part, a movable part that is arranged such that the movable part is translationally movable and is rotatable within a plane with respect to the fixed part, an actuator that drives the movable part, a first restricting unit configured to restrict translational movement of the movable part by abutment between the movable part and the fixed part, and a second restricting unit configured to restrict rotational movement of the movable part by abutment between the movable part and the fixed part, wherein the second restricting unit is arranged at a location more remote from a center of rotation of the movable part with respect to the fixed part than the first restricting unit.

In a second aspect of the present invention, there is provided an image capturing apparatus including a fixed part, a movable part that is arranged such that the movable part is translationally movable and is rotatable within a plane with respect to the fixed part, an actuator that drives the movable part, a first restricting unit configured to restrict translational movement of the movable part by abutment between the movable part and the fixed part, a second restricting unit configured to restrict rotational movement of the movable part by abutment between the movable part and the fixed part, an image sensor that is held by the movable part, and a blur corrector configured to control driving of the movable part so as to cancel out the image blur, wherein the second restricting unit is arranged at a location more remote from a center of rotation of the movable part with respect to the fixed part than the first restricting unit, and wherein the image sensor is held by the movable part such that an imaging surface of the image sensor is translationally movable and rotatable within a plane orthogonal to an image capturing optical axis of the image capturing apparatus.

In a third aspect of the present invention, there is provided a method of controlling a driving device including a movable part which is translationally movable and rotatable within a plane with respect to a fixed part, and a plurality of rolling members arranged between the fixed part and the movable part, and having the plurality of rolling members arranged inside enclosures provided on the movable part, respectively, such that the rolling members are prevented from being brought into abutment with inner walls of the enclosures, within a driving control range used when actually driving the driving device, including translationally moving the movable part without rotationally moving the movable part, such that a circle having a predetermined radius from the center of rotation is drawn, and rotationally moving the movable part about the center of rotation through a predetermined rotational angle after translationally moving the movable part, and rotating, when rotationally moving the movable part, the movable part in a first rotational direction about the center of rotation of the movable part and a second rotational direction opposite to the first rotational direction through the same angle, respectively.

According to the present invention, in the driving device that has the movable part which is translationally and rotationally movable within a plane with respect to the fixed part, it is possible to properly restrict the translational movement and the rotational movement of the movable part while preventing the movable part from protruding outward.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

An embodiment of the present invention will now be described in detail below with reference to the accompanying drawings. In the present embodiment, a configuration in which a driving device according to the present invention is applied to an image blur correction device of an image capturing apparatus will be described.

Figure 1:
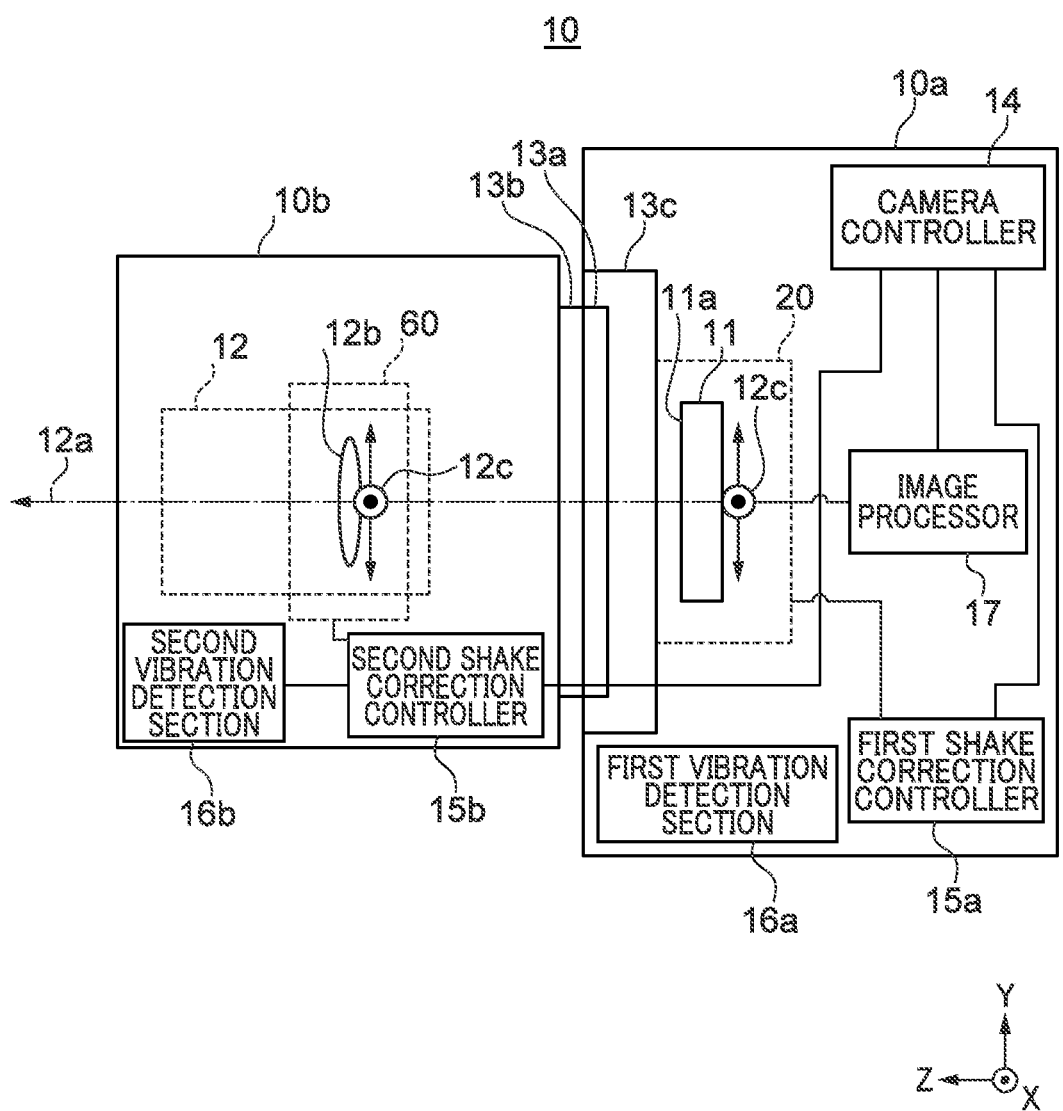
FIG. 1 is a schematic diagram of an image capturing apparatus according to an embodiment of the present invention.

FIG. 1 is a schematic diagram of the image capturing apparatus, denoted by reference numeral 10, according to the embodiment of the present invention. The image capturing apparatus 10 is a so-called mirrorless digital camera and has an image capturing apparatus body 10a (hereinafter referred to as the "body 10a") and a lens barrel 10b which is removably attached to the body 10a.

The body 10a includes an image sensor 11 having an imaging surface 11a, a base member 13c, a body-side mount member 13a, a camera controller 14, a first shake correction controller 15a, a first vibration detection section 16a, an image processor 17, and a first blur correction unit (blur corrector) 20. The lens barrel 10b includes an image capturing optical system 12 including a shake correction lens 12b, a lens-side mount member 13b, a second shake correction controller 15b, a second vibration detection section 16b, and a second blur correction unit (blur corrector) 60.

A virtual light ray as a representative of a light flux irradiated onto the imaging surface 11a of the image sensor 11 through the image capturing optical system 12 is referred to as the "image capturing optical axis 12a" (hereinafter described as the "optical axis 12a"), and a plane orthogonal to the optical axis 12a is referred to as the "optical axis orthogonal plane 12c" (hereinafter described as the "optical axis orthogonal plane 12c"). The optical axis 12a passes through the center of the imaging surface 11a and is orthogonal to the imaging surface 11a.

To make clear the arrangement and positional relationship of the components of the image capturing apparatus 10 within the image capturing apparatus 10, an X direction, a Y direction, and a Z direction, which are orthogonal to one another, are defined as shown in FIG. 1. The Z direction is a direction parallel to the optical axis 12a, the X direction is a width direction of the image capturing apparatus 10, and the Y direction is a height direction of the image capturing apparatus 10. In a case where the X direction and the Z direction are both in a horizontal plane, the Y direction is a vertical direction, and the optical axis orthogonal plane 12c is an X-Y plane.

The image sensor 11 is, specifically, a CMOS image sensor or CCD image sensor, for example, and is arranged such that the imaging surface 11a faces toward an object (toward the lens barrel 10b) and is orthogonal to the optical axis 12a. The image sensor 11 generates image signals by photoelectrically converting an optical image of an object formed on the imaging surface 11a by the image capturing optical system 12. The image signals generated by the image sensor 11 are subjected to a variety of processing operations performed by the image processor 17 to thereby be converted to image data, and the generated image data is stored in a memory (storage device), not shown. The camera controller 14 is an arithmetic unit in a main IC, not shown, and controls the overall operation of the image capturing apparatus 10 by receiving an input operation of a user via operating means, not shown.

The image capturing optical system 12 is formed by a lens group, a diaphragm, and so forth, none of which are shown, arranged within the lens barrel 10b, and causes light reflected from an object, not shown, to form a an image on the imaging surface 11a of the image sensor 11. In the image capturing apparatus 10, to arrange the image sensor 11 with high positional accuracy with respect to the optical axis 12a, the image sensor 11 is mounted on the base member 13c provided in the body 10a, and the lens barrel 10b is also coupled to the base member 13c. More specifically, the image sensor 11 is mounted on the base member 13c via the first blur correction unit 20, and the lens barrel 10b is coupled to the base member 13c via the lens-side mount member 13b and the body-side mount member 13a.

The first blur correction unit 20 corrects an image blur caused by a shake (including vibration and swing) of the image capturing apparatus 10 by moving the image sensor 11 in a desired direction in the optical axis orthogonal plane 12c or rotating the same in the optical axis orthogonal plane 12c, thereby making it possible to obtain a clear object image. More specifically, when a shake has caused a change in posture of the image capturing apparatus 10 during image capturing, imaging positions of an object light flux on the imaging surface 11a of the image sensor 11 change, whereby a blur occurs in an image obtained through the image sensor 11. At this time, in a case where the change in posture of the image capturing apparatus 10 is sufficiently small, the changes in the imaging positions are uniform within the imaging surface 11a and can be regarded to be caused by the translational or rotational movement (imaging surface shake) in the optical axis orthogonal plane 12c. Therefore, by translationally moving or rotating the image sensor 11 in the optical axis orthogonal plane 12c so as to cancel out this imaging surface shake, it is possible to obtain a clear object image in which the image blur has been corrected. Note that the image capturing apparatus 10 may be configured such that when moving the image sensor 11 in a direction parallel to the imaging surface, the image sensor 11 can be moved in a direction orthogonal to the imaging surface (an optical axis direction, i.e. a direction along the optical axis 12a).

Similarly, the second blur correction unit 60 corrects an image blur caused by a shake of the image capturing apparatus 10 by moving the shake correction lens 12b in the optical axis orthogonal plane 12c in a direction in which the imaging surface shake can be cancel outed, thereby making it possible to obtain a clear object image. Note that the principle of shake correction, i.e. blur correction performed by moving the image sensor 11 or the shake correction lens 12b is known, and hence detailed description thereof is omitted. Further, the image forming apparatus may be configured such that when moving the shake correction lens 12b in the optical axis orthogonal direction, the shake correction lens 12b can be moved in the optical axis direction.

The first blur correction unit 20 is roughly comprised of a fixed part, a movable part, and a plurality of driving-force generation sections. The fixed part is fixed to the base member 13c, and the movable part holds the image sensor 11. Further, the movable part is supported by the fixed part with three degrees of freedom, and is translationally movable relative to the fixed part in a desired direction in the optical axis orthogonal plane 12c and is also rotatable in the optical axis orthogonal plane 12c. That is, the first blur correction unit 20 is configured as a driving device (so-called XYθ stage) that is capable of controlling three-axis driving and is capable of moving the image sensor 11 in a desired direction in the optical axis orthogonal plane 12c and rotating the same in the optical axis orthogonal plane 12c.

The second blur correction unit 60 is roughly comprised of a fixed part, a movable part, and a plurality of driving-force generation sections. The fixed part is fixed to a casing of the lens barrel 10b, not shown, and the movable part holds the shake correction lens 12b. Further, the movable part is supported by the fixed part with two degrees of freedom and is movable relative to the fixed part in a desired direction in the optical axis orthogonal plane 12c. That is, the second blur correction unit 60 is configured as a driving device (so-called XY stage) that is capable of controlling two-axis driving and is capable of moving the shake correction lens 12b in a desired direction in the optical axis orthogonal plane 12c.

The first vibration detection section 16a and the second vibration detection section 16b are each vibration detecting means for detecting an angular speed, an acceleration, and so forth, of the image capturing apparatus 10 in each direction, as shake information of the image capturing apparatus 10, and is, more specifically, implemented e.g. by a gyro sensor or an acceleration sensor. Further, the first shake correction controller 15a and the second shake correction controller 15b each calculate an angle change amount and a movement amount of the image capturing apparatus 10 in each direction as the shake information by integrating angular speeds and accelerations, detected by the first vibration detection section 16a and the second vibration detection section 16b.

Further, the first shake correction controller 15a calculates a movement target value of the image sensor 11 based on the shake information detected by the first vibration detection section 16a and controls the movement of the image sensor 11 by controlling driving of the first blur correction unit 20. Similarly, the second shake correction controller 15b calculates a movement target value of the shake correction lens 12b based on the shake information detected by the second vibration detection section 16b and controls the movement of the shake correction lens 12b by controlling driving of the second blur correction unit 60.

Note that the image capturing apparatus 10 may be configured to include only the first blur correction unit 20. In a case where the second blur correction unit 60 is not included, the shake correction lens 12b is basically not required. Therefore, the image capturing optical system 12 of the lens barrel 10b is designed such that the desired optical characteristics can be obtained with a lens configuration without having the shake correction lens 12b.

Next, a description will be given of details of the first blur correction unit 20 as an embodiment of the driving device according to the present invention. Note that the configuration of the first blur correction unit 20 is not applied to the second blur correction unit 60. This is because as is clear from the configuration of the first blur correction unit 20, described hereinafter, in a case where the image sensor 11 included in the first blur correction unit 20 is simply replaced by the shake correction lens 12b, part of a light flux transmitting through the shake correction lens 12b is blocked. Therefore, as the second blur correction unit 60, there is used not the driving device according to the present invention, but a driving device that does not drive the movable part 20b for rotation, for example, the driving device applied to the lens barrel, which is described in the above-mentioned Japanese Patent No. 3969927.

Figure 2A:
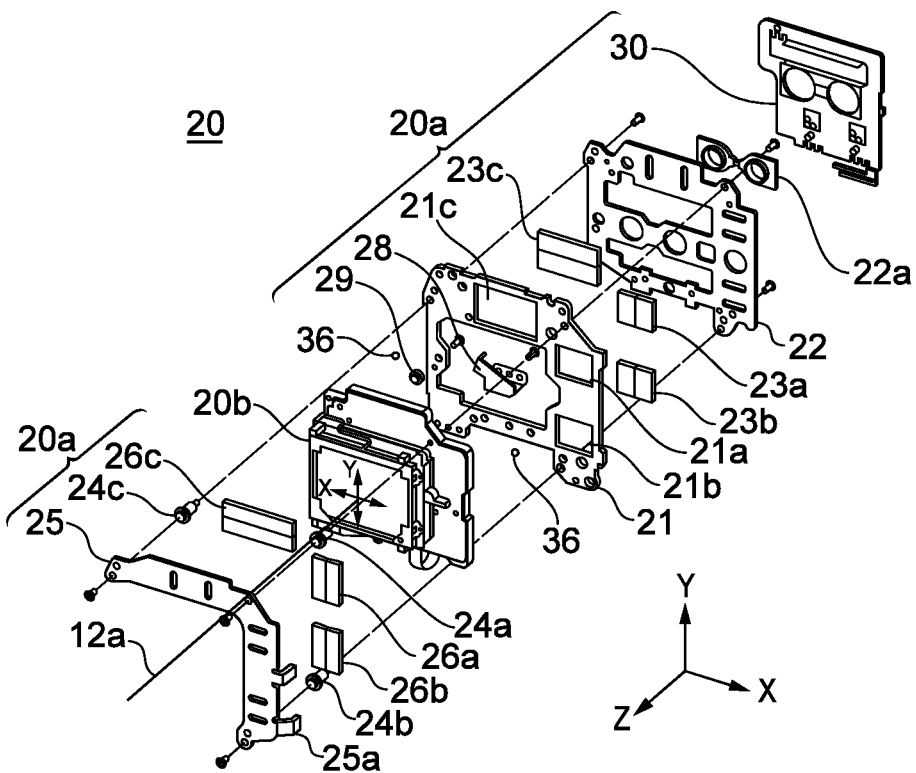
FIGS. 2A and 2B are exploded perspective views of a first blur correction unit.
Figure 2B:
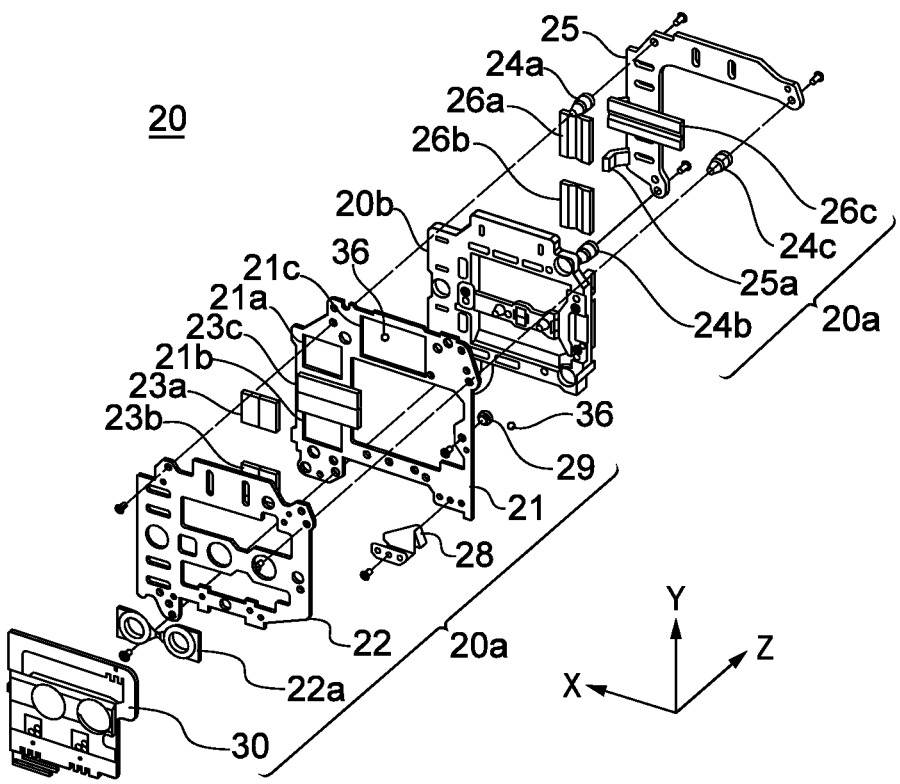

FIGS. 2A and 2B are exploded perspective views of the first blur correction unit 20, and FIG. 2A and FIG. 2B differ from each other in a direction of viewing the first blur correction unit 20. The first blur correction unit 20 includes the fixed part, denoted by reference numeral 20a, and the movable part, denoted by reference numeral 20b. Note that FIGS. 2A and 2B show the movable part 20b in an unexploded state, and the fixed part 20a in an exploded state.

The fixed part 20a has a fixed member 21, a rear yoke 22, a first rear magnet group 23a, a second rear magnet group 23b, and a third rear magnet group 23c. The fixed member 21 is formed with a first opening 21a, a second opening 21b, and a third opening 21c. The first rear magnet group 23a, the second rear magnet group 23b, and the third rear magnet group 23c are fixed to the rear yoke 22 e.g. with adhesive and are arranged such that the first rear magnet group 23a, the second rear magnet group 23b, and the third rear magnet group 23c are surrounded by the first opening 21a, the second opening 21b, and the third opening 21c, respectively.

In the present embodiment, as the first rear magnet group 23a, the second rear magnet group 23b, and the third rear magnet group 23c, there are used magnet groups each formed by two magnets that are magnetized in the optical axis direction (Z direction) and are arranged such that the two magnets generate magnetic fields in opposite directions. However, this is not limitative, but there may be used single magnets each magnetized to the two poles.

The fixed part 20a further has a first columnar member 24a, a second columnar member 24b, a third columnar member 24c, a front yoke 25, a first front magnet 26a, a second front magnet 26b, and a third front magnet 26c. The front yoke 25 is fixed to the fixed member 21 with screws via the first columnar member 24a, the second columnar member 24b, and the third columnar member 24c. The first front magnet 26a, the second front magnet 26b, and the third front magnet 26c are fixed to the front yoke 25 e.g. with adhesive, respectively.

In the present embodiment, as the first front magnet 26a, the second front magnet 26b, and the third front magnet 26c, there are used single magnets each magnetized to two poles. However, this is not limitative, but magnet groups each formed by two magnets that are magnetized in the optical axis direction and are arranged such that the two magnets generate magnetic fields in opposite directions.

The first rear magnet group 23a and the first front magnet 26a form a first magnetic circuit. Similarly, the second rear magnet group 23b and the second front magnet 26b form a second magnetic circuit, and the third rear magnet group 23c and the third front magnet 26c form a third magnetic circuit.

The fixed part 20a further has a first restricting member 28, a second restricting member 29, and a cover 30. The rear yoke 22 has a first restricting portion 22a, and the front yoke 25 has a second restricting portion 25a (protruding portion) protruding toward the movable part 20b. The movement of the movable part 20b is restricted in a predetermined range in the optical axis orthogonal plane 12c by the first restricting member 28, the second restricting member 29, the first restricting portion 22a, the second restricting portion 25a, the first columnar member 24a, the second columnar member 24b, and the third columnar member 24c (described in detail hereinafter). Abutting portions of the respective components for restricting the movement of the movable part 20b are each provided with a cushioning member, such as rubber, for absorbing a shock of abutment so as to avoid breakage and reduce collision noise. The cover 30 prevents a flexible print substrate, such as a driving FPC 35, described hereinafter, and the rear yoke 22 from being brought into contact with each other. Although described in detail hereinafter, balls 36 are arranged between the movable part 20b and the fixed member 21.

Figure 3A:
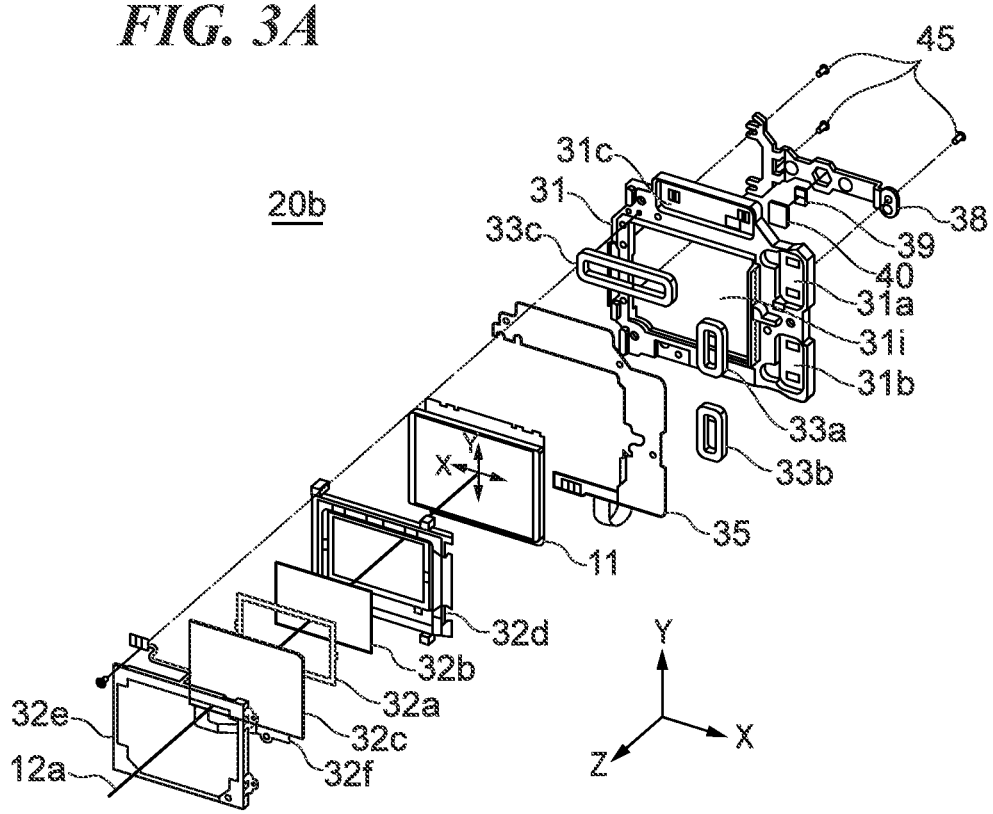
FIGS. 3A and 3B are exploded perspective views of a movable part as a component of the first blur correction unit.
Figure 3B:
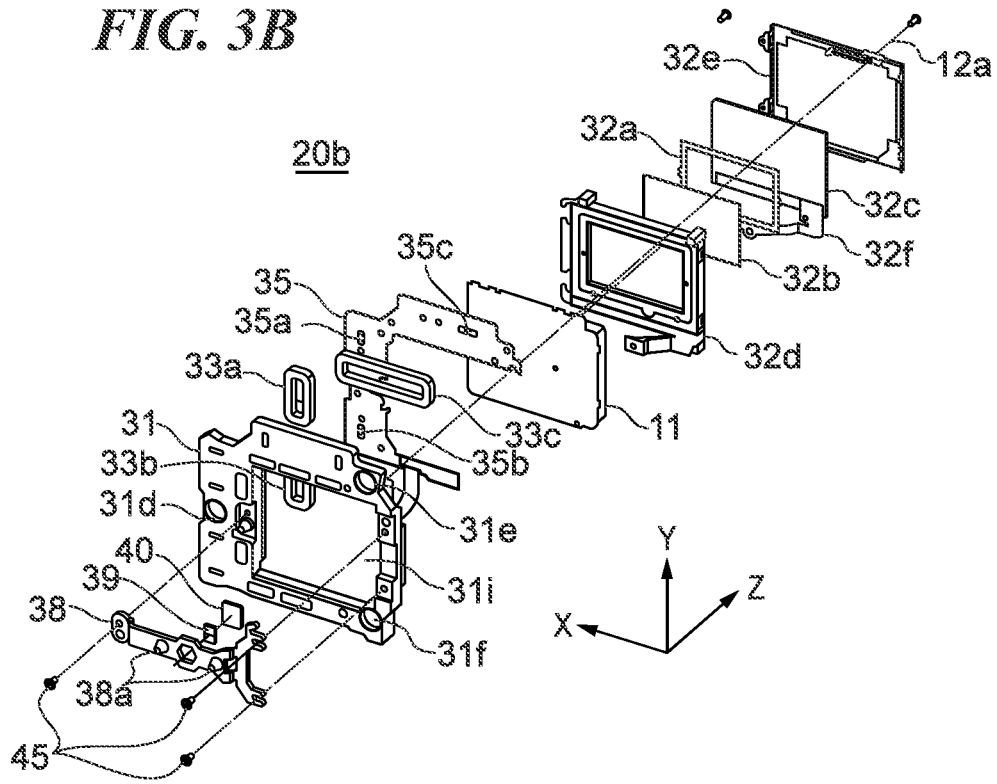

FIGS. 3A and 3B are exploded perspective views of the movable part 20b, and FIG. 3A and FIG. 3B differ from each other in a direction of viewing the movable part 20b. The movable part 20b has an image sensor-holding member 31 and the image sensor 11. The image sensor 11 is fixed to the image sensor-holding member 31 with adhesive, but details thereof will be described hereinafter. Further, the movable part 20b has a mask 32a, an infrared absorbing filter 32b, an optical lowpass filter 32c, and a vibration unit 32f. The mask 32a, the infrared absorbing filter 32b, and the optical lowpass filter 32c are held by a holder member 32d and a holder sheet metal 32e, and are fixed to the image sensor 11 e.g. with an adhesive member. The mask 32a prevents unnecessary light from entering front outside the photographing optical path. The optical lowpass filter 32c reduces moire generated by a repeated pattern of an object. The vibration unit 32f is provided on the optical lowpass filter 32c so as to eliminate foreign material, such as dust, attached to the surface of the optical lowpass filter 32c, by vibrating the optical lowpass filter 32c. Note that the principle and control of elimination of foreign material, performed by the vibration unit 32f, are known, and hence detailed description thereof is omitted.

The movable part 20b includes a first coil 33a, a second coil 33b, a third coil 33c, and the driving FPC 35. The driving FPC 35 is fixed to the image sensor-holding member 31 e.g. with adhesive, and is arranged such that the driving FPC 35 overlaps the first coil 33a, the second coil 33b, and the third coil 33c, on a plane projected in the optical axis direction (on an X-Y plane as viewed from the Z direction).

The image sensor-holding member 31 has a first recess 31a, a second recess 31b, and a third recess 31c. The first coil 33a, the second coil 33b, and the third coil 33c are arranged in the first recess 31a, the second recess 31b, and the third recess 31c, respectively.

The first magnetic circuit and the first coil 33a form a VCM as a first actuator, the second magnetic circuit and the second coil 33b form a VCM as a second actuator, and the third magnetic circuit and the third coil 33c form a VCM as a third actuator.

The Lorentz force is generated in a direction which is orthogonal to the direction of the magnetic field generated by the first magnetic circuit in the optical axis direction and a direction in which electric current flows in the first coil 33a, and a resultant force direction of the Lorentz force changes according to the energization direction of the first coil 33a. Similar Lorentz forces are generated in the second magnetic circuit and the second coil 33b, and also in the third magnetic circuit and the third coil 33c, respectively. The first actuator and the second actuator generate respective forces (driving forces) substantially in parallel to the X direction, whereby a translational force in the X direction is generated by the sum of the respective forces, and a rotational force about the optical axis is generated by a difference between the respective forces. The third actuator generates a translational force in the Y direction. Comparison of the position of the first restricting portion 22a and the positions of the first to third actuators shows that the first restricting portion 22a is disposed at a location closer to the center of rotation of the movable part 20b with respect to the fixed member 21 than the first to third actuators. Note that the system of the actuator is not limited to the VCM, but a vibration actuator or the like may be used.

The driving FPC 35 has a first detector 35a, a second detector 35b, and a third detector 35c, mounted thereon. The first detector 35a, the second detector 35b, and the third detector 35c are arranged inside the first coil 33a, the second coil 33b, and the third coil 33c, respectively. The first detector 35a, the second detector 35b, and the third detector 35c are e.g. hall elements. The first detector 35a detects a magnetic force of the first magnetic circuit, and the first shake correction controller 15a calculates positional information of the movable part 20b in the optical axis orthogonal plane 12c with respect to the fixed part 20a (specifically, a position and an angle about the optical axis) based on a result of detection by the first detector 35a. The same is applied to the second detector 35b and the third detector 35c.

The first coil 33a, the second coil 33b, and the third coil 33c are electrically connected to the driving FPC 35, and the first shake correction controller 15a controls the magnitude of electric current caused to flow in each coil via the driving FPC 35. That is, the first shake correction controller 15a controls the driving of the movable part 20b using feedback control, based on a difference between the movement target value of the image sensor 11 calculated based on the shake information detected by the first vibration detection section 16a and the current position of the image sensor 11, detected by the hall elements.

The movable part 20b is urged against the fixed member 21 as a component of the fixed part 20a by a suction force generated between the rear yoke 22 and a thrust magnet 39 due to a magnetic force of the thrust magnet 39 via the balls 36 (see FIGS. 2A and 2B) which are rolling members. In other words, the rear yoke 22 and the thrust magnet 39 form an urging section for urging the movable part 20b against the fixed part 20a. Note that, to generate the suction force between the rear yoke 22 and the thrust magnet 39, the rear yoke 22 is required to be a magnetic body (member formed of a magnetic material). Details of the urging section will be described hereinafter.

The balls 36 are arranged inside a first enclosure 31d, a second enclosure 31e, and a third enclosure 31f, formed in the image sensor-holding member 31, respectively. Although described in detail hereinafter, the balls 36 roll when the movable part 20b moves in the optical axis orthogonal plane 12c with respect to the fixed part 20a for shake correction, and hence a load is hardly generated by friction between the balls 36, and the image sensor-holding member 31 and the fixed member 21. Further, the movement of the movable part 20b in a direction opposite to the direction in which the urging section formed by the rear yoke 22 and the thrust magnet 39 urges the movable part 20b is restricted by the front yoke 25 and the first restricting member 28. Therefore, even when an external force for separating the movable part 20b from the fixed member 21 (moving the movable part 20b toward the lens barrel 10b) is applied, e.g. by an impact applied to the image capturing apparatus 10, the movable part 20b is prevented from dropping off from the fixed part 20a.

The movable part 20b has a connection member 38, and the connection member 38 is bridged to an opening 31i of the image sensor-holding member 31 and is fixed to the image sensor-holding member 31 with screws 45 at opposite ends (in the X direction) across the optical axis 12a. The connection member 38 is formed with abutting portions 38a as protrusions protruding toward the −Z side of the optical axis direction, at two locations, and the two abutting portions 38a are inserted in two holes formed in the first restricting portion 22a of the rear yoke 22, respectively. Although described in detail hereinafter, the translational movement of the movable part 20b in the optical axis orthogonal plane 12c is restricted within a fixed range by the abutment between the outer peripheral surface of each abutting portion 38a and a wall surface (inner wall) of the associated hole of the first restricting portion 22a. Position restricting means for restricting the position of the movable part 20b, formed by the abutting portions 38a and the first restricting portion 22a, is referred to as the first restricting means as deemed appropriate. Note that the holes as the first restricting portion 22a and the protrusions as the abutting portions 38a are only required to be provided such that one of each hole and each protrusion is provided in or on the fixed part 20a and the other is provided in or on the movable part 20b. That is, the protrusions may be formed on the fixed part 20a, and the holes may be formed in the movable part 20b.

The thrust magnet 39 and a thrust yoke 40 are fixed to the connection member 38 e.g. with adhesive, and the thrust magnet 39 is magnetized in the optical axis direction. Note that as the thrust magnet 39, a magnet magnetized to the two poles such that magnetic fields different from each other in direction are arranged in the Y direction can be used, but a magnet magnetized to a single pole can be used as well.

The urging section formed by the rear yoke 22 and the thrust magnet 39 is arranged inside a triangle formed by the three balls 36 arranged inside the first enclosure 31d, the second enclosure 31e, and the third enclosure 31f, respectively. Consequently, it is possible to generate the urging forces for the respective balls 36 in a well balanced manner.

Next, the configuration for restricting the relative position of the movable part 20b with respect to the fixed part 20a in the optical axis orthogonal plane 12c will be described in detail with reference to FIGS. 4 to 7. First, a general behavior of a point at a predetermined position on a plane as the point moves on the plane will be described with reference to FIGS. 4 and 5 for ease of understanding the behavior of the movable part 20b.

Figure 4:
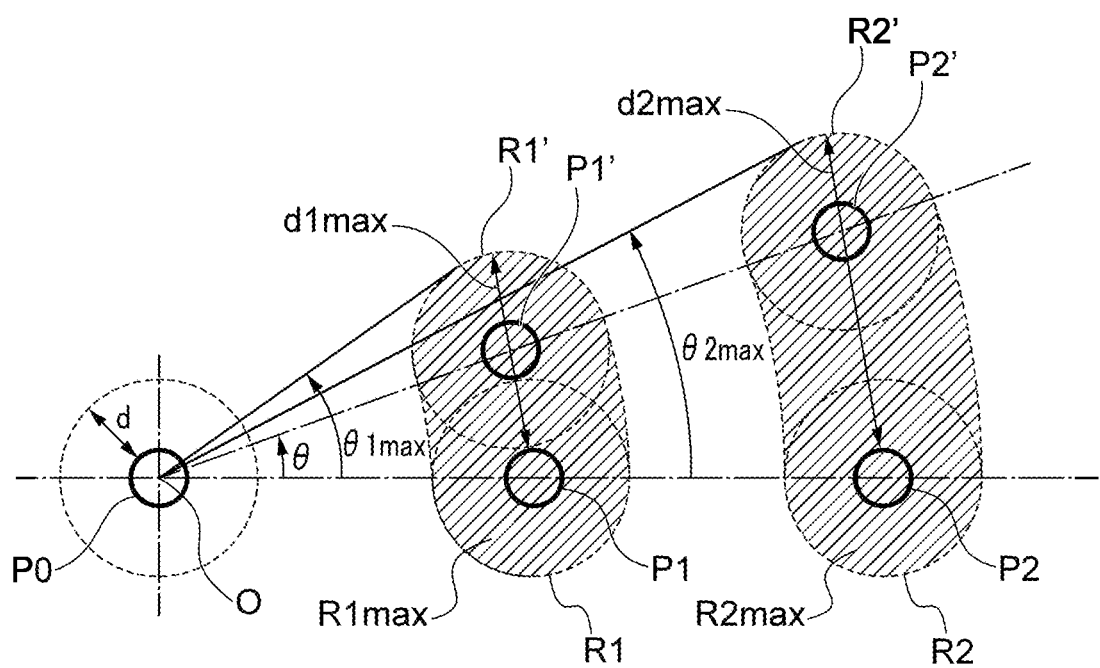
FIG. 4 is a diagram useful in explaining translational movement and rotational movement of a physical object on a plane.

FIG. 4 is a diagram useful in explaining translational movement and rotational movement of a physical object on a plane using a point O as a reference. In FIG. 4, a position P0 is a position of the physical object existing on the point O, a position P1 is a position separated from the point O by a predetermined distance, and a position P2 is a position more remote from the point O than the position P1. Positions moved by rotating the positions P1 and P2 about the point O in a counterclockwise direction through an angle $\theta$ are positions P1' and P2'. Further, it is assumed that the physical object can translationally move in a desired direction on the plane by a distance d wherever the object exists on the plane. A range R1 indicates a translationally movable range of the physical object at the position P1, and a range R2 indicates a translationally movable range of the physical object at the position P2. Similarly, a range R1' indicates a translationally movable range of the physical object at the position P1', and a range R2' indicates a translationally movable range of the physical object at the position P2'.

The physical object can rotationally move on an arc having the point O as the center through an angle θ. That is, the physical object at the position P1 (or the position P1') can rotationally move between the position P1 and the position P1', on an arc having the point O as the center and passing the position P1 and the position P1'. Similarly, the physical object at the position P2 (or the position P2') can rotationally move between the position P2 and the position P2', on an arc having the point O as the center and passing the position P2 and the position P2'.

Therefore, the range within which the physical object at the position P1 can move is a range R1max which is a path of the range R1 rotated about the point O through the angle θ. Similarly, the range within which the physical object at the position P2 can move is a range R2max which is a path of the range R2 rotated about the point O through the angle θ. Note that the range R1max can be said as a range within which the physical object at the position P1' can move, and similarly, the range R2max can be said as a range within which the physical object at the position P2' can move.

In the ranges R1max and R2max, the maximum movement amounts by which the object can move in rotational movement through the angle θ and the translational movement are d1max and d2max, respectively, and the maximum movement angles at which this maximum movement amounts can be realized only by the rotational movement about the point O are θ1max and θ2max. Then, as is clear from FIG. 4, d1max<d2max and θ1max>θ2max hold. Thus, as the distance from the point O as the center of rotation is larger, the maximum movement amount dmax by which the object can move in the rotational movement and the translational movement becomes larger, and the maximum movement angle θmax at which this maximum movement amount dmax can be realized by the rotational movement about the point O becomes smaller. The relationship between the distance from the point O (the center of rotation) and dmax and θmax is expressed as shown in FIG. 5.

Figure 5:
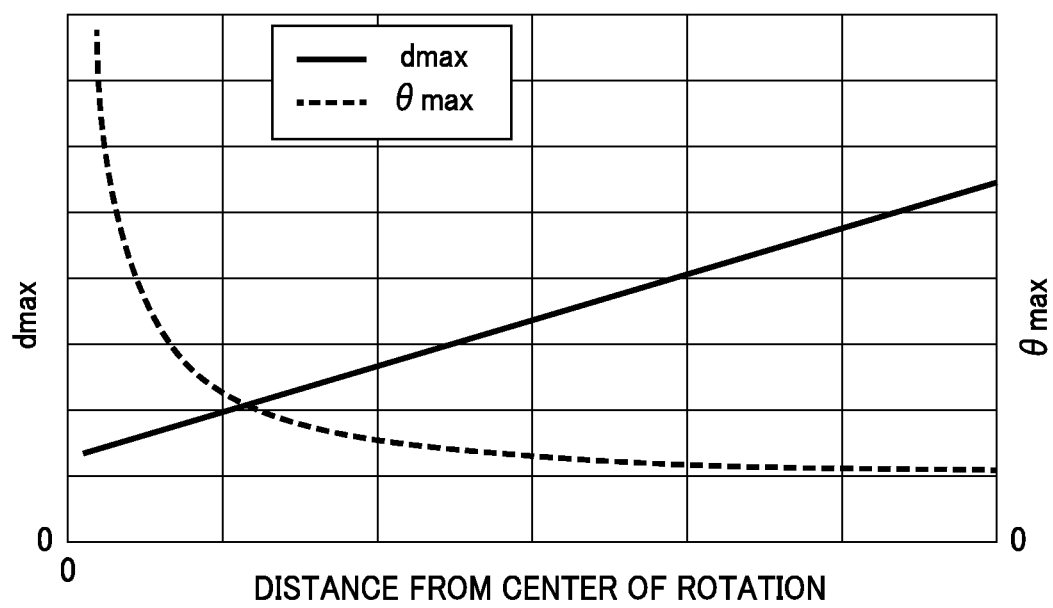
FIG. 5 is a diagram showing a relationship between a distance from a center of rotation, and a maximum movement amount and a maximum rotational angle.

Inversely, it is clear from FIG. 5 that if the translational movement and the rotational movement of the movable part 20b are attempted to be restricted by the same restricting means, it is not easy to restrict the rotational movement with high accuracy at a position close to the optical axis 12a corresponding to the point O. Further, at a position remote from the optical axis 12a, the translational movement of the movable part 20b comes to be restricted to a movement amount largely exceeding the control range of the translational movement. In view of this, in the present embodiment, the movement range of the movable part 20b is restricted as described below.

Figure 6A:
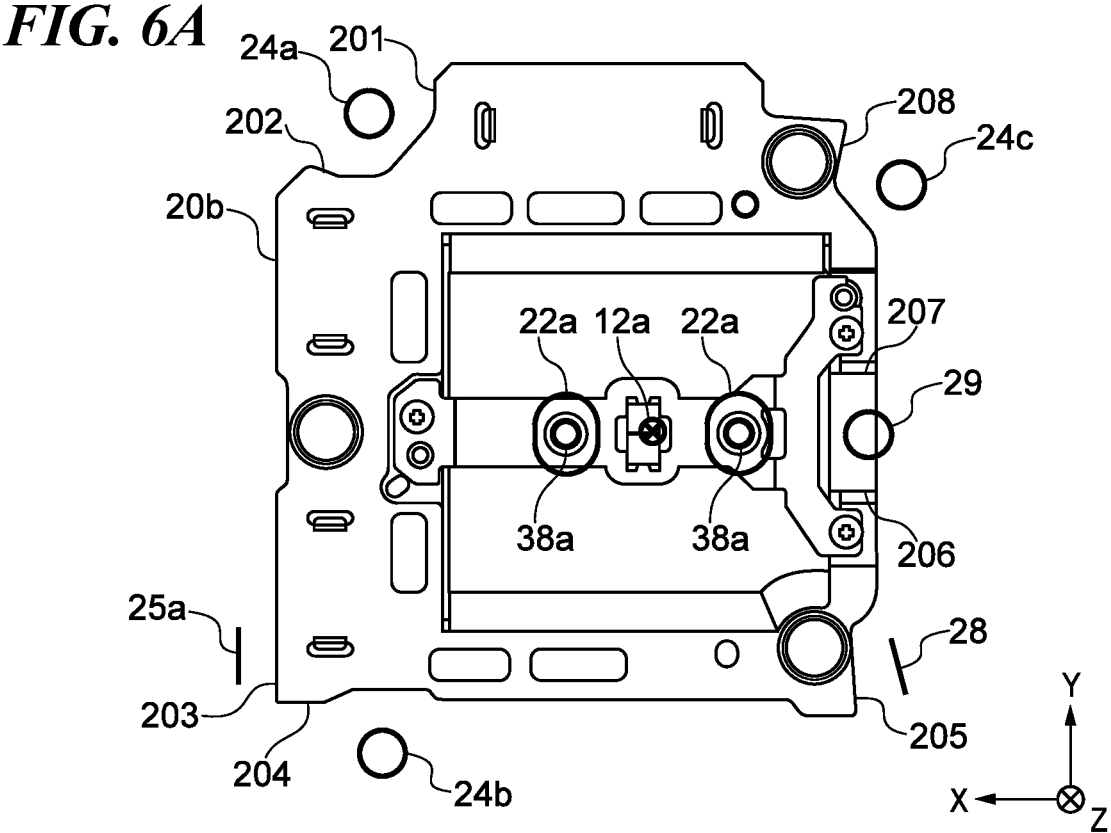
FIGS. 6A and 6B are views useful in explaining a configuration for restricting a relative position of the movable part with respect to a fixed part.

Next, the configuration for restricting the movement of the movable part 20b in the optical axis orthogonal plane 12c with respect to the fixed part 20a will be described with reference to FIGS. 6A and 6B, and FIGS. 7A and 7B. FIG. 6A is a rear view (view as viewed from the rear side of the image capturing apparatus 10 along the optical axis 12a) useful in explaining the configuration for restricting the relative position of the movable part 20b in the optical axis orthogonal plane 12c with respect to the fixed part 20a. Note that in FIG. 6A, to make clear the configuration for restricting the position of the movable part 20b, illustration of the components involved in the position restriction of the movable part 20b is simplified, and illustration of the components which are not directly involved in the position restriction is omitted. For example, for the first restricting portion 22a of the rear yoke 22, the first columnar member 24a, the second columnar member 24b, the third columnar member 24c, the second restricting portion 25a of the front yoke 25, the first restricting member 28, and the second restricting member 29, only contact surfaces of these are illustrated to simplify the illustration.

The image sensor 11 included in the movable part 20b is substantially rectangular, with its long side being substantially parallel to the X direction and its short side being substantially parallel to the Y direction. The movable part 20b has a plurality of abutting portions 201 to 208. The abutting portions 201 to 208 are portions of the outer peripheral surface of the image sensor-holding member 31 as a component of the movable part 20b. Further, some of the abutting portions 201 to 208 are provided in recesses or cutouts formed in the movable part 20b (image sensor-holding member 31) so as to reduce the amount of protrusion of the movable part 20b toward the outside during driving the movable part 20b for rotation.

Figure 7A:
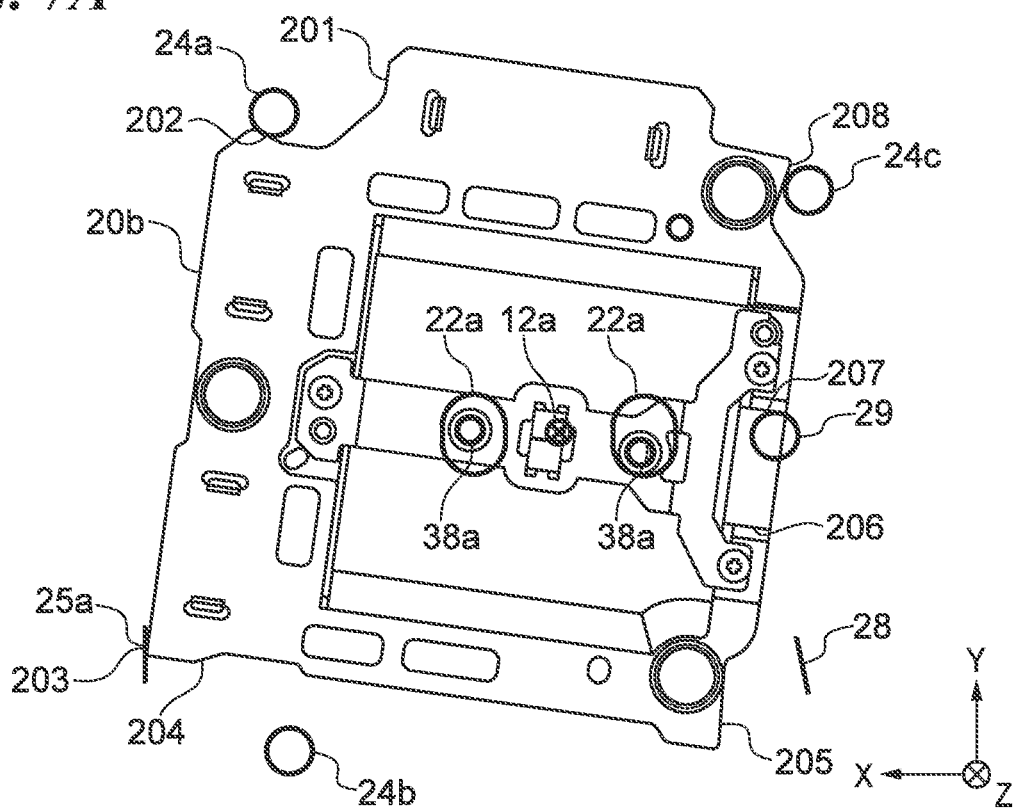
FIGS. 7A and 7B are other views useful in explaining the configuration for restricting the relative position of the movable part with respect to the fixed part.
Figure 7B:
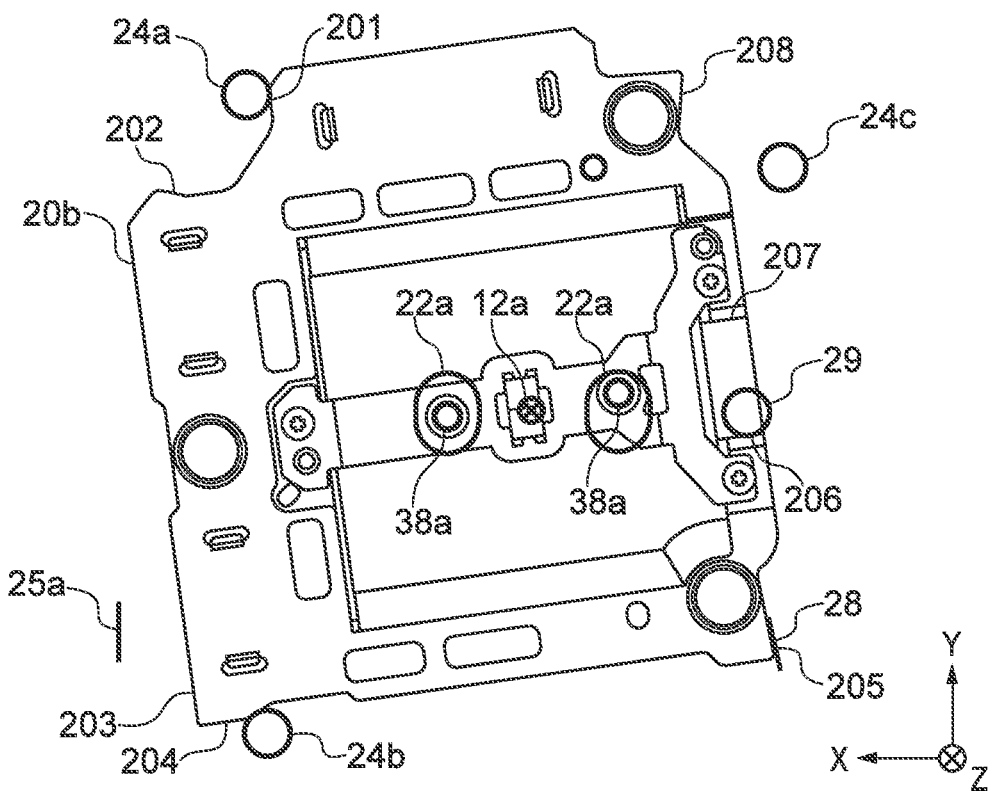

Although described in detail hereinafter with reference to FIGS. 7A and 7B, when the movable part 20b is rotationally moved, the abutting portion 201 or the abutting portion 202 is brought into abutment with the first columnar member 24a, and the abutting portion 206 or the abutting portion 207 is brought into abutment with the second restricting member 29, according to the rotational direction. Further, the abutting portion 203, the abutting portion 204, the abutting portion 205, and the abutting portion 208 are brought into abutment with the second restricting portion 25a, the second columnar member 24b, a protruding portion formed on the first restricting member 28, and the third columnar member 24c, respectively, according to the rotational direction of the movable part 20b. Position restricting means for restricting the position of the movable part 20b, formed by the abutting portions 201 to 208, and the columnar members, the restricting portions, and the restricting members, associated with these abutting portions 201 to 208, is referred to as the second restricting means as deemed appropriate.

Note that as described above, the connection member 38 connected to the movable part 20b is formed with the abutting portions 38a at two locations, and the outer peripheral surfaces of the abutting portions 38a are brought into abutment with the inner peripheral walls of the first restricting portions 22a of the rear yoke 22, respectively, whereby the translational movement of the movable part 20b is restricted. The abutting portions 38a and the abutting portions 201 to 208, and the restricting portions associated with these abutting portions are arranged so as not to be brought into abutment with each other when the first blur correction unit 20 is controlled by the first shake correction controller 15a, and the movable part 20b is driven within the movement range necessary for performing blur correction.

Figure 6B:
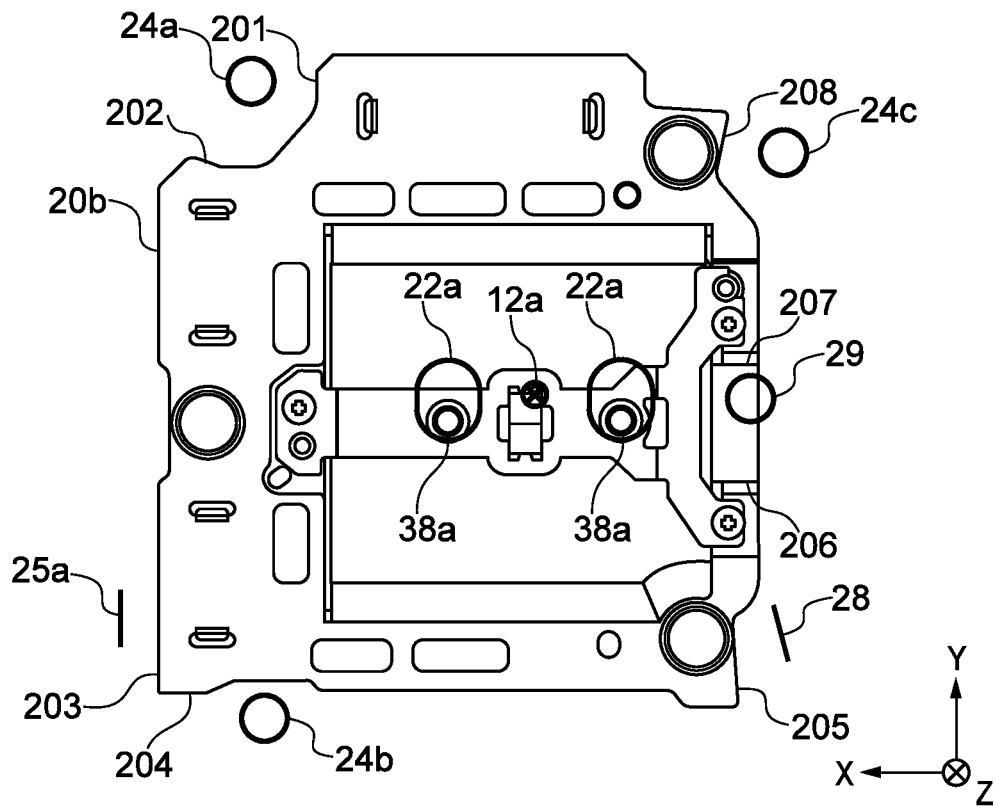

First, a case where the movable part 20b performs the translational movement in the optical axis orthogonal plane 12c without rotation about the optical axis 12a (rotation having the optical axis 12a as the rotational center axis) will be described. In this case, the two abutting portions 38a formed on the connection member 38 are brought into abutment with the first restricting portion 22a of the rear yoke 22, whereby the movement of the movable part 20b is restricted. At this time, the abutting portions 201 to 208 which are more remote from the optical axis 12a than the abutting portions 38a are not brought into abutment with the associated members. That is, the translational movement of the movable part 20b is restricted only by the two abutting portions 38a and the first restricting portion 22a. FIG. 6B shows an example of a state in which the movable part 20b is not rotated about the optical axis 12a and is translated in the Y direction.

Next, a case where the movable part 20b rotates in a clockwise direction in the optical axis orthogonal plane 12c, as viewed from the rear side toward the front side of the image capturing apparatus 10, will be described. In this case, one or a plurality of combinations of the abutting portion 202 and the first columnar member 24a, the abutting portion 203 and the second restricting portion 25a, the abutting portion 207 and the second restricting member 29, and the abutting portion 208 and the third columnar member 24c are brought into abutment with each other, whereby the movement of the movable part 20b is restricted. In a case where the movable part 20b translates in the optical axis orthogonal plane 12c in addition to the rotation in the clockwise direction, the abutting portions 38a may be brought into abutment with the first restricting portion 22a. On the other hand, even when the rotation angle of the movable part 20b becomes the maximum in the clockwise direction from the state shown in FIG. 6A, the abutting portions 38a are not brought into abutment with the first restricting portion 22a. FIG. 7A shows a state in which in a case where the rotation angle of the movable part 20b becomes the maximum in the clockwise direction from the state shown in FIG. 6A, the movable part 20b is stabilized by the plurality of restricting portions arranged to surround g the optical axis 12a.

Next, a case where the movable part 20b rotates in the counterclockwise direction in the optical axis orthogonal plane 12c, as viewed from the rear side toward the front side of the image capturing apparatus 10, will be described. In this case, one or a plurality of combinations of the abutting portion 201 and the first columnar member 24a, the abutting portion 204 and the second columnar member 24b, the abutting portion 205 and the first restricting member 28, and the abutting portion 206 and the second restricting member 29 are brought into abutment with each other, whereby the movement of the movable part 20b is restricted. In a case where the movable part 20b translates in the optical axis orthogonal plane 12c in addition to the rotation in the counterclockwise direction, the abutting portions 38a may be brought into abutment with the first restricting portion 22a. On the other hand, even when the rotation angle of the movable part 20b becomes the maximum in the counterclockwise direction from the state shown in FIG. 6A, the abutting portions 38a are not brought into abutment with the first restricting portion 22a. FIG. 7B shows a state in which in a case where the rotation angle of the movable part 20b becomes the maximum in the counterclockwise direction from the state shown in FIG. 6A, the movable part 20b is stabilized by the plurality of restricting portions arranged to surround the optical axis 12a. By arranging these components as described above, it is possible to suppress the amount of protrusion of the movable part 20b toward the outside with respect to the fixed part 20a in the optical axis orthogonal plane 12c when the movable part 20b is rotationally moved.

As described above, in the present embodiment, out of the movements of the movable part 20b in the optical axis orthogonal plane 12c, the translational movement not including the rotation about the optical axis 12a is restricted only by the abutment between the abutting portions 38a and the first restricting portion 22a, which are arranged at locations small in distance from the optical axis 12a. Further, out of the movements of the movable part 20b in the optical axis orthogonal plane 12c, the rotational movement about the optical axis 12a is restricted by the restriction elements associated with the abutting portions 201 to 208 in a posture in which the abutting portions 38a and the first restricting portion 22a are not brought into abutment with each other when the rotational angle becomes the maximum. Note that the restriction elements refer to the first columnar member 24a, the second restricting portion 25a, the second columnar member 24b, the first restricting member 28, the second restricting member 29, and the third columnar member 24c.

Note that as described above, the elastic members, such as rubber, are provided on portions of the columnar members, the restricting portions, and the restricting members, which are brought into abutment with the movable part 20b, to ease an impact and also suppress generation of collision noise. In the first blur correction unit 20, the rotational movement of the movable part 20b is restricted by substantially simultaneous abutment of the movable part 20b with columnar members, restricting portions, and/or restricting members, at at least three locations. This makes it possible to disperse a force acting on the columnar members, the restricting portions, or the restricting members and suppress deterioration of the elastic members.

Incidentally, in a case where the blur correction control by the first blur correction unit 20 is performed during actual image capturing, an operation for adjusting the position of the balls 36 (hereinafter referred to as the "reset operation") is required to be performed in advance so as to prevent a situation where the balls 36 do not roll, causing an increase in the driving load. As the timing of the reset operation, there may be mentioned timing of immediately after the image capturing apparatus 10 is powered on. Further, the reset operation may be performed by a user operation. Then, next, the reset operation on the first blur correction unit 20 will be described in detail with reference to FIGS. 8A to 13B.

First, the first enclosure 31d, the second enclosure 31e, and the third enclosure 31f will be described. Note that the same description is given of the first enclosure 31d, the second enclosure 31e, and the third enclosure 31f, and hence in this description, the first enclosure 31d, the second enclosure 31e, and the third enclosure 31f are each generically referred to as the "enclosure 311".

Figure 8A:
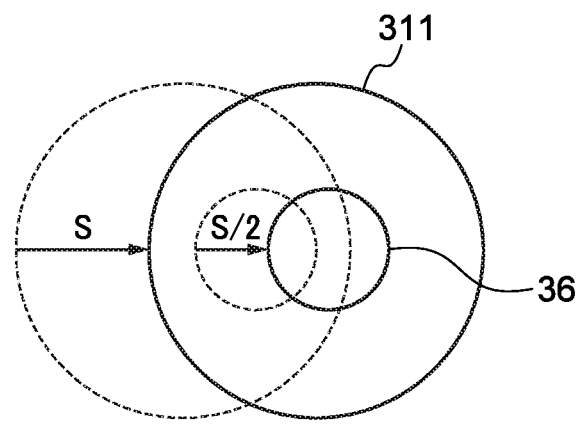
FIGS. 8A and 8B are schematic diagrams showing a relationship between a ball and an enclosure at a time when the movable part moves.

FIG. 8A is a schematic diagram showing a relationship between the ball 36 and the enclosure 311 on the optical axis orthogonal plane 12c when the movable part 20b performs relative movement to the fixed part 20a in the optical axis orthogonal plane 12c (hereinafter simply expressed as "the movable part 20b moves"). The enclosure 311 having a circular shape is formed in the image sensor-holding member 31 to prevent the ball 36 held between the fixed member 21 and the image sensor-holding member 31 from dropping off in any of all directions in the optical axis orthogonal plane 12c. In FIG. 8A, the positions of the enclosure 311 and the ball 36 before moving are indicated by broken lines. Assuming that the enclosure 311 as part of the movable part 20b moves to the right by a distance S as viewed in FIG. 8A, the ball 36 rolls due to friction generated between the fixed member 21 and the image sensor-holding member 31. At this time, the ball 36 rolls and moves in the same direction as the direction in which the movable part 20b moves, in other words the enclosure 311 moves, by a distance S/2 corresponding to half of the moving distance of the movable part 20b. In FIG. 8A, the positions of the enclosure 311 and the ball 36 after moving are indicated by solid lines.

Figure 8B:
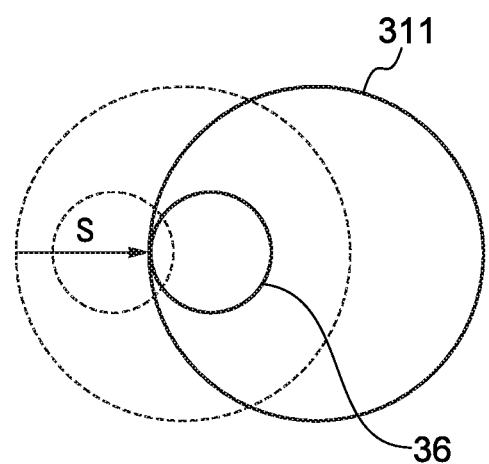

FIG. 8B is a schematic diagram showing a relationship between the enclosure 311 and the ball 36 on the optical axis orthogonal plane 12c in a case where the ball 36 is brought into abutment with the enclosure 311 when the movable part 20b moves. In FIG. 8B, the positions of the enclosure 311 and the ball 36 before moving are indicated by broken lines. Let it be assumed that the enclosure 311 as part of the movable part 20b moves to the right by the distance S as viewed in FIG. 8B. In a case where a distance between the left side surface of the enclosure 311 and the left side surface of the ball 36 is smaller than the distance S/2 before the movable part 20b moves, in other words the enclosure 311 moves, the ball 36 is brought into abutment with the left side surface of the enclosure 311 when the movable part 20b is moving. As a result, the ball 36 cannot roll and moves by being dragged by the enclosure 311 in a state in contact with the enclosure 311, and in this state, friction larger than in a state in which the ball 36 is rolling is generated. However, in a case where the movable part 20b i.e. the enclosure 311 returns from this state to the original position (position indicated by the broken line) and then performs the same movement (movement to the position indicated by the solid line), since the ball 36 has moved by being dragged by the enclosure 311 in the first movement, the ball 36 is not brought into abutment with the enclosure 311 in second and subsequent movements.

Here, the inner diameter of the enclosure 311 will be described. The movement of the movable portion 20b when the first shake correction controller 15a controls the first blur correction unit 20 to perform blur correction is limited within a range of a predetermined translational movement amount and a range of a predetermined rotational angle about the optical axis 12a. By causing the ball 36 to roll such that the ball 36 is prevented from being brought into abutment with (the wall surface of) the enclosure 311 within these ranges, it is possible to reduce the friction load.

Figure 9A:
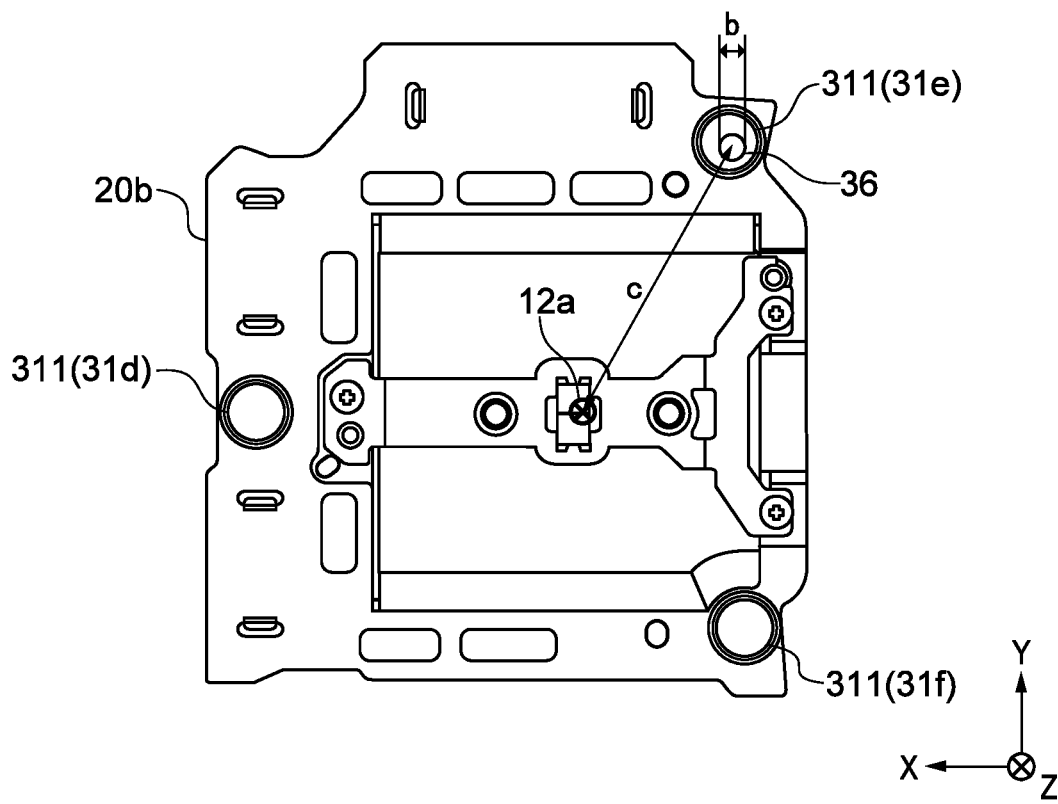
FIGS. 9A and 9B are diagrams useful in explaining a relationship between a distance from an optical axis and an inner diameter of the enclosure.
Figure 9B:
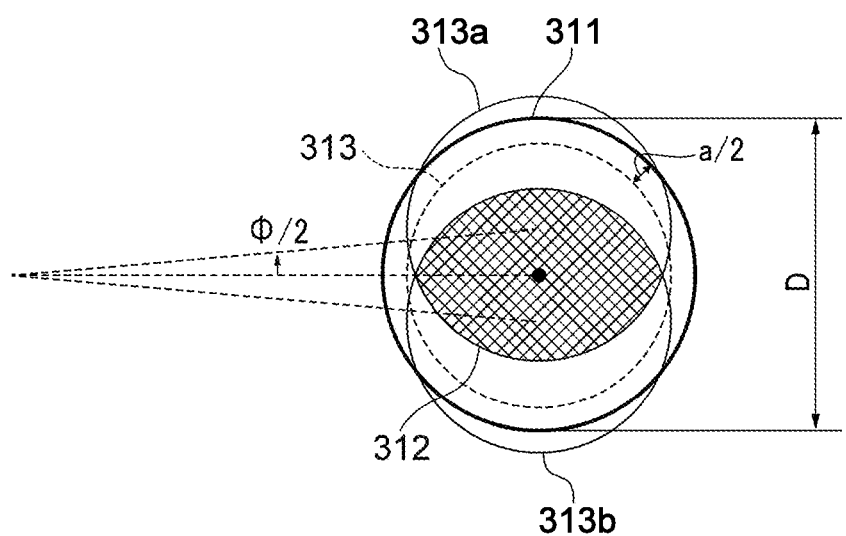

FIGS. 9A and 9B are diagrams useful in explaining a relationship between a distance from the optical axis 12a and the inner diameter of the enclosure 311. The translational movement amount of the movable part 20b, the rotational angle of rotation of the movable part 20b about the optical axis 12a, and the diameter of the ball 36 are represented by a, φ, and b, respectively. As shown in FIG. 9A, the inner diameter of the enclosure 311 positioned away from the optical axis 12a by a distance c is expressed by a+b+c×sin φ+z. Note that "z" is an amount of a mechanical margin, and has a value not smaller than 0 (zero).

FIG. 9B is a diagram showing a first area 312 where the ball 36 is to be positioned so as not to be brought into abutment with the enclosure 311 even when the movable part 20b translationally moves by the distance a and rotates about the optical axis 12a through the angle φ, for shake correction.

As described above with reference to FIG. 8A, when the movable part 20b translationally moves by the distance a, the ball 36 rolls in the same direction by a distance a/2. Assuming that the diameter (inner diameter) of the enclosure 311 is represented by "D", if the ball 36 is positioned within a second area 313 which is coaxial with the enclosure 311 and is surrounded by a circle having a diameter obtained by D−a, before the movable part 20b moves, even when the movable part 20b translationally moves by the distance a, the ball 36 is prevented from being brought into abutment with the enclosure 311.

Similarly, when the movable part 20b rotates about the optical axis 12a through the angle φ, the ball 36 rolls in the same direction through an angle φ/2. Therefore, a common area between a third area 313a occupied by the second area 313 having rotated about the optical axis 12a through an angle+φ/2 and a fourth area 313b occupied by the second area 313 having rotated about the optical axis 12a through an angle −φ/2 is the first area 312. If the ball is positioned in the first area 312, even when the movable part 20b rotates about the optical axis 12a through the angle φ, the ball 36 is prevented from moving out of the second area 313. That is, if the ball 36 is positioned within the first area 312, even when the movable part 20b translationally moves by the distance a and also rotates about the optical axis 12a through the angle φ, and the ball 36 is prevented from being brought into abutment with the enclosure 311.

Next, a first example of the reset operation (hereinafter referred to as the "first reset operation") will be described with reference to FIGS. 10A to 10C, and FIGS. 11A and 11B. FIGS. 10A to 10C, and FIGS. 11A and 11B are diagrams each schematically showing an area where the ball 36 can be positioned with respect to the enclosure 311 when the movable part 20b has moved by the first reset operation.

Figure 10A:
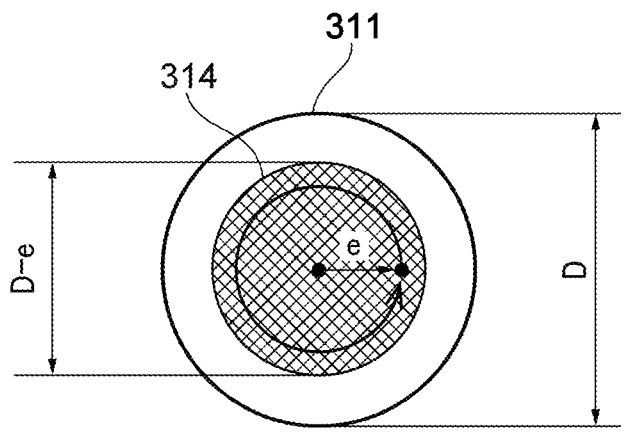
FIGS. 10A to 10C are first diagrams useful in explaining a first reset operation of the ball.

FIG. 10A is a diagram showing a fifth area 314 where the ball 36 exists after the movable part 20b has translationally moved without rotationally moving, such that a circle having a radius e from the optical axis 12a as the center is drawn. As described above, the ball 36 moves to a position where the ball 36 is not brought into abutment with the enclosure 311 within a range through which the movable part 20b has passed once, and hence the ball 36 exists within the fifth area 314 after moving. The diameter of the fifth area 314 is reduced by half of the diameter of the movement circle, i.e. "e" from the inner diameter D of the enclosure 311, and hence the diameter is represented by "D−e".

Figure 10B:
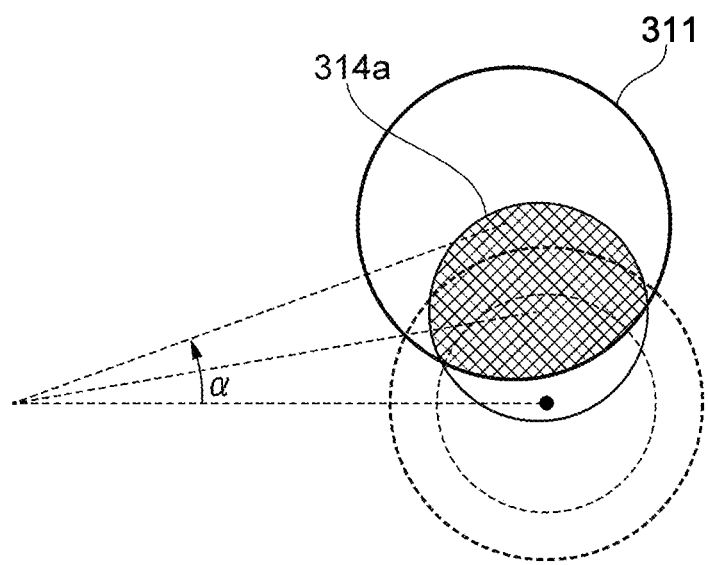

When the movable part 20b rotates about the optical axis 12a in a counterclockwise direction (first rotational direction in which the movable part 20b is rotatable about the optical axis 12a) through an angle α from the state shown in FIG. 10A, the ball 36 is accommodated within a sixth area 314a indicated in FIG. 10B. This is because in a case where the fifth area 314 is rotated about the optical axis 12a through an angle α/2 and the ball 36 is brought into abutment with the enclosure 311 at this time, the ball 36 is dragged by the enclosure 311 without rolling.

Figure 10C:
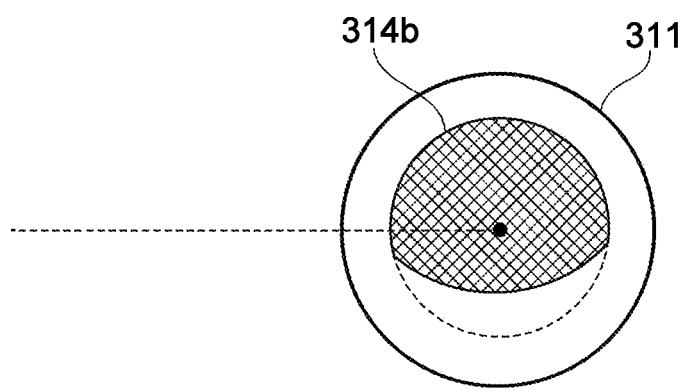
Figure 11A:
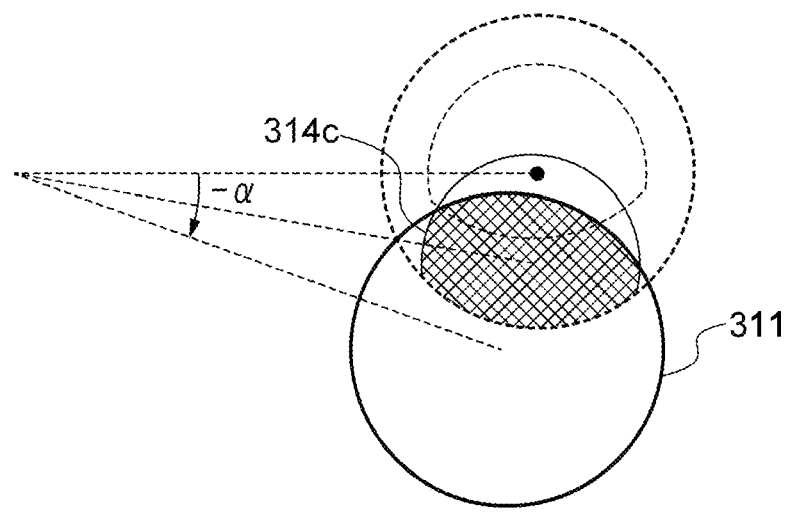
FIGS. 11A and 11B are second diagrams useful in explaining the first reset operation of the ball.
Figure 11B:
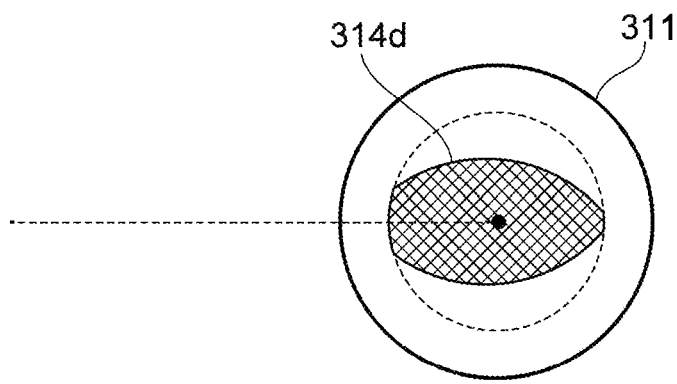

When the movable part 20b rotates about the optical axis 12a through the angle −α from the state shown in FIG. 10B (in other words, when the movable part 20b rotates through the angle α in a second rotational direction opposite to the first rotational direction), the ball 36 is accommodated within a seventh area 314b indicated in FIG. 10C. Similarly, when the movable part 20b rotates about the optical axis 12a through the angle −α from the state shown in FIG. 10C, the ball 36 is accommodated within an eighth area 314c indicated in FIG. 11A. This is because in a case where the seventh area 314b is rotated about the optical axis 12a through an angle −α/2 and the ball 36 is brought into abutment with the enclosure 311 at this time, the ball 36 is dragged by the enclosure 311 without rolling. When the movable part 20b is rotated about the optical axis 12a through the angle α from the state shown in FIG. 11A, the ball 36 is accommodated within a ninth area 314d indicated in FIG. 11B.

Therefore, if the ninth area 314d is included in the first area 312, even when the movable part 20b translationally moves by the distance a and rotates about the optical axis 12a through the angle φ for blur correction, the ball 36 is prevented from being brought into abutment with the enclosure 311. In other words, the first reset operation is execution of the translational movement and the rotational movement of the movable part 20b as described above with reference to FIGS. 10A to 11B. In the first reset operation, the translational movement is performed, and hence the movement angle of the rotational movement can be reduced, and further, in the actual blur correction, it is possible to avoid abutment of the ball 36 against the enclosure 311 within the driving control range of the movable part 20b and maintain a state in which the driving load is small.

Next, a second example of the reset operation (hereinafter referred to as the "second reset operation") will be described with reference to FIGS. 12A to 12C and FIGS. 13A and 13B. FIGS. 12A to 12C, and FIGS. 13A and 13B are diagrams each schematically showing an area where the ball 36 can be positioned with respect to the enclosure 311 when the movable part 20b has moved by the second reset operation.

Figure 12A:
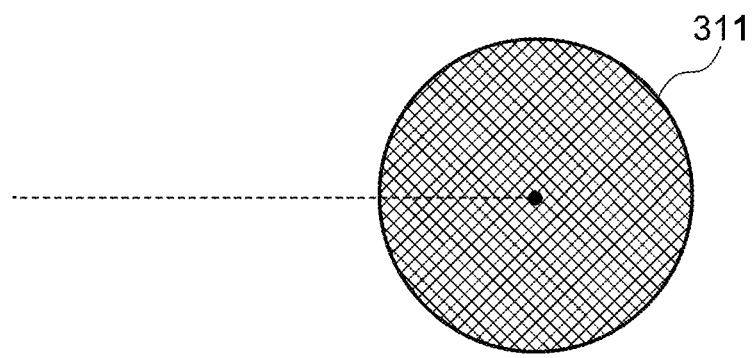
FIGS. 12A to 12C are first diagrams useful in explaining a second reset operation of the ball.

FIG. 12A shows a state in which the ball 36 exists inside the enclosure 311. When the movable part 20b rotates about the optical axis 12a in a counterclockwise direction through an angle β from the state shown in FIG. 12A, the ball 36 is accommodated in a tenth area 314e indicated in FIG. 12B. This is because in a case where the area in which the ball 36 is accommodated, indicated in FIG. 12A, is rotated about the optical axis 12a through an angle β/2, and the ball 36 is brought into abutment with the enclosure 311 at this time, the ball 36 is dragged by the enclosure 311 without rolling.

Figure 12B:
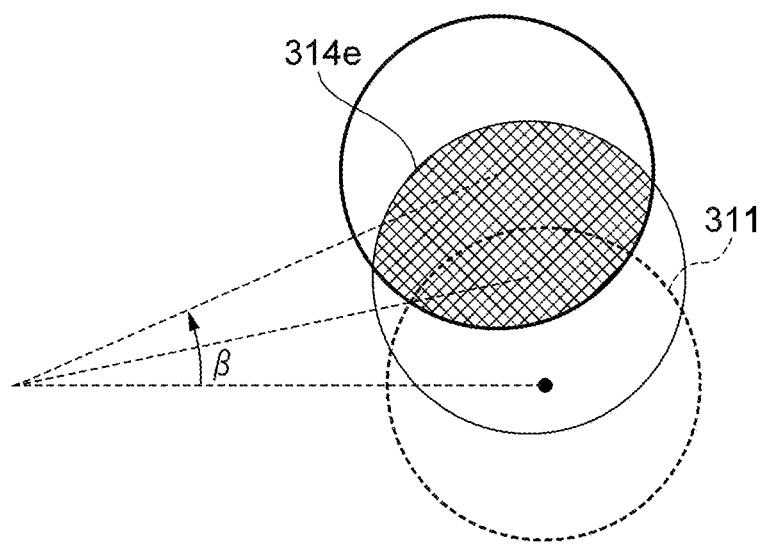
Figure 12C:
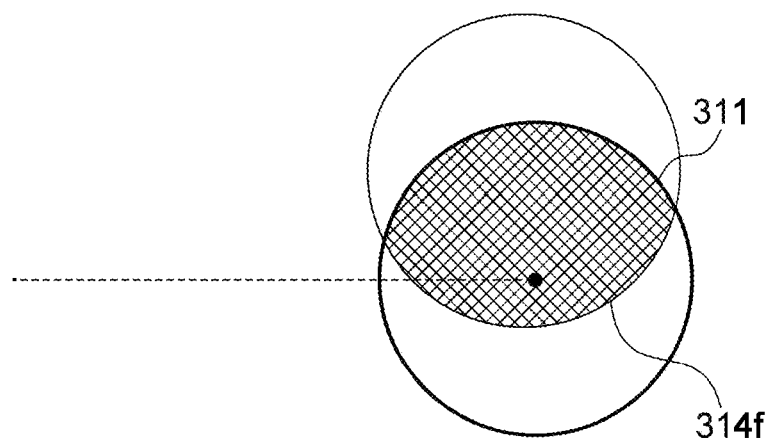
Figure 13A:
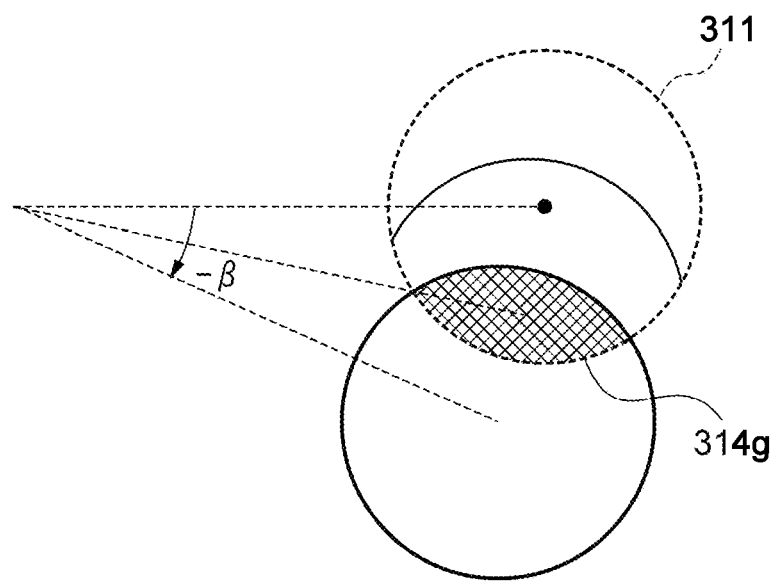
FIGS. 13A and 13B are second diagrams useful in explaining the second reset operation of the ball.
Figure 13B:
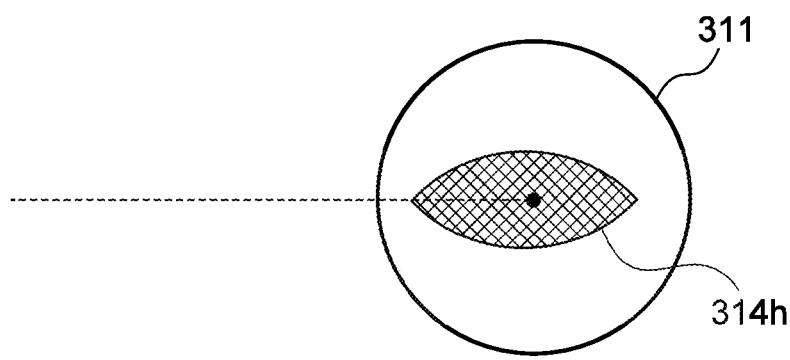

When the movable part 20b rotates about the optical axis 12a through an angle −β from the state shown in FIG. 12B (rotates in a clockwise direction through the angle β), the ball 36 is accommodated in an eleventh area 314f indicated in FIG. 12C. Similarly, when the movable part 20b rotates about the optical axis 12a through the angle −β from the state shown in FIG. 12C, the ball 36 is accommodated in a twelfth area 314g indicated in FIG. 13A. This is because in a case where the eleventh area 314f is rotated about the optical axis 12a through an angle −β/2, and the ball 36 is brought into abutment with the enclosure 311 at this time, the ball 36 is dragged by the enclosure 311 without rolling. When the movable part 20b rotates about the optical axis 12a through the angle β from the state shown in FIG. 13A, the ball 36 is accommodated in a thirteenth area 314h indicated in FIG. 13B.

Therefore, if the thirteenth area 314h is included in the first area 312, even when the movable part 20b translationally moves by the distance a and also rotates about the optical axis 12a through the angle for blur correction, the ball 36 is prevented from being brought into abutment with the enclosure 311. In other words, it can be said that the second reset operation is execution of the rotational movement of the movable part 20b as described above with reference to FIGS. 12A to 13B. However, the angle β is required to be larger than the maximum value of the rotational angle which can be controlled for blur correction. In the second reset operation, the translational movement of the movable part 20b is not required, and in the actual blur correction, it is possible to avoid abutment of the ball 36 against the enclosure 311 within the driving control range of the movable part 20b and maintain a state in which the driving load is small.

Note that the first reset operation and the second reset operation are performed within a range within which the movable part 20b is prevented from being brought into abutment with the fixed part 20a in the first restricting means and the second restricting means because if the movable part 20b and the fixed part 20a are brought into abutment with each other, collision noise is generated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The embodiments are described above only by way of example, and it is also possible to combine the embodiments as deemed appropriate.

For example, in the above-described embodiment, the description is given of the example in which the driving device according to the present invention is applied to the image blur correction device of the image capturing apparatus. However, the driving device according to the present invention is applied not only to this, but for example, the driving device according to the present invention can be applied to an XYθ table for placing a sample to be observed on a microscope, an XYθ table for placing an object to be assembled in a variety of manufacturing devices, etc. Further, although in the above-described embodiment, as the image capturing apparatus 10, the so-called mirrorless camera is described, the driving device according to the present invention can also be applied to an image blur correction device of a digital single-lens reflex camera equipped with a quick return mirror mechanism.

This application claims the benefit of Japanese Patent Application No. 2021-110972, filed Jul. 2, 2021, which is hereby incorporated by reference herein in its entirety.

What is claimed is:

1. A driving device comprising:
 a fixed part;
 a movable part that is arranged such that the movable part is translationally movable and is rotatable within a plane with respect to the fixed part;
 an actuator that drives the movable part;
 a first restricting unit configured to restrict translational movement of the movable part by abutment between the movable part and the fixed part; and
 a second restricting unit configured to restrict rotational movement of the movable part by abutment between the movable part and the fixed part,
 wherein the second restricting unit is arranged at a location more remote from a center of rotation of the movable part with respect to the fixed part than the first restricting unit.

2. The driving device according to claim 1, wherein in a state in which translational movement of the movable part with respect to the fixed part is restricted by the first restricting unit, the second restricting unit does not restrict rotational movement of the movable part.

3. The driving device according to claim 1, wherein in a state in which rotational movement of the movable part with respect to the fixed part is restricted by the second restricting unit, the first restricting unit does not restrict translational movement of the movable part.

4. The driving device according to claim 1, wherein the first restricting unit is formed by holes that are formed in one of the fixed part and the movable part, and protrusions that are formed on the other of the fixed part and the movable part and are inserted in the holes, respectively, and
 wherein translational movement of the movable part with respect to the fixed part is restricted by abutment of outer peripheral surfaces of the protrusions with inner walls of the holes when the movable part translationally moves.

5. The driving device according to claim 1, wherein the second restricting unit is formed by columnar portions or protruding portions, which are formed on the fixed part, and part of an outer periphery of the movable part, and
 wherein rotational movement of the movable part with respect to the fixed part is restricted by abutment of the part of the outer periphery of the movable part with the columnar portions or the protruding portions when the movable part rotationally moves.

6. The driving device according to claim 5, wherein the columnar portions or the protruding portions are brought into substantially simultaneous abutment with the part of the outer periphery of the movable part at at least three locations.

7. The driving device according to claim 1, wherein the first restricting unit is provided at a location closer to the center of rotation of the movable part with respect to the fixed part than the actuator.

8. The driving device according to claim 1, further comprising a plurality of rolling members arranged between the fixed part and the movable part, and
wherein the movable part has enclosures provided for the plurality of rolling members, respectively, to prevent the rolling members from dropping off from the driving device, and
the driving device further comprising a processor configured to perform a reset operation for positioning the plurality of rolling members in respective predetermined areas, by driving the movable part in advance so as to prevent the rolling members from being brought into abutment with inner walls of the enclosures within a driving control range used when actually driving the driving device.

9. The driving device according to claim 8, further comprising an urging section that urges the movable part against the fixed part via the rolling members.

10. The driving device according to claim 8, wherein the reset operation includes:
a first operation for translationally moving the movable part without rotationally moving the movable part, such that a circle having a predetermined radius from the center of rotation is drawn, and
a second operation for rotationally moving the movable part about the center of rotation through a predetermined rotational angle, and
wherein the processor performs the second operation after performing the first operation.

11. The driving device according to claim 10, wherein the second operation rotationally moves the movable part in a first rotational direction about the center of rotation and a second rotational direction opposite to the first rotational direction through the same angle, respectively.

12. The driving device according to claim 9, wherein the reset operation rotationally moves the movable part about the center of rotation through a larger rotational angle than an angle through which rotational movement of the movable part is controlled.

13. The driving device according to claim 12, wherein the reset operation rotationally moves the movable part in a first rotational direction about the center of rotation and a second rotational direction opposite to the first rotational direction through the same angle, respectively.

14. An image capturing apparatus comprising:
a fixed part;
a movable part that is arranged such that the movable part is translationally movable and is rotatable within a plane with respect to the fixed part;
an actuator that drives the movable part;
a first restricting unit configured to restrict translational movement of the movable part by abutment between the movable part and the fixed part;
a second restricting unit configured to restrict rotational movement of the movable part by abutment between the movable part and the fixed part;
an image sensor that is held by the movable part; and
a blur corrector configured to control driving of the movable part so as to cancel out the image blur,
wherein the second restricting unit is arranged at a location more remote from a center of rotation of the movable part with respect to the fixed part than the first restricting unit, and
wherein the image sensor is held by the movable part such that an imaging surface of the image sensor is translationally movable and rotatable within a plane orthogonal to an image capturing optical axis of the image capturing apparatus.

15. A method of controlling a driving device including a movable part which is translationally movable and rotatable within a plane with respect to a fixed part, and a plurality of rolling members arranged between the fixed part and the movable part, and having the plurality of rolling members arranged inside enclosures provided on the movable part, respectively, such that the rolling members are prevented from being brought into abutment with inner walls of the enclosures, within a driving control range used when actually driving the driving device, comprising:
translationally moving the movable part without rotationally moving the movable part, such that a circle having a predetermined radius from the center of rotation is drawn; and
rotationally moving the movable part about the center of rotation through a predetermined rotational angle after translationally moving the movable part; and
rotating, when rotationally moving the movable part, the movable part in a first rotational direction about the center of rotation of the movable part and a second rotational direction opposite to the first rotational direction through the same angle, respectively.

* * * * *